United States Patent
Jain et al.

(10) Patent No.: US 10,108,522 B1
(45) Date of Patent: Oct. 23, 2018

(54) SAMPLING TECHNIQUE TO ADJUST APPLICATION SAMPLING RATE

(71) Applicant: International Business Machines Corporation, Armonk, NY (US)

(72) Inventors: Nitisha Jain, New Delhi (IN); Prakash Murali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/605,574

(22) Filed: May 25, 2017

(51) Int. Cl.
*G06F 11/34* (2006.01)
*G06F 11/36* (2006.01)
*G06F 11/30* (2006.01)

(52) U.S. Cl.
CPC ........ *G06F 11/3409* (2013.01); *G06F 11/302* (2013.01); *G06F 11/3604* (2013.01)

(58) Field of Classification Search
CPC . G06F 11/3409; G06F 11/3604; G06F 11/302
USPC ................................. 717/130, 131
See application file for complete search history.

(56) References Cited

U.S. PATENT DOCUMENTS

| 7,190,937 B1* | 3/2007 | Sullivan | H04B 17/382 |
| | | | 455/130 |
| 8,375,368 B2 | 2/2013 | Tuck et al. | |
| 2016/0042743 A1* | 2/2016 | Nyshadham | H03M 1/12 |
| | | | 704/203 |
| 2016/0356634 A1* | 12/2016 | Czompo | G01D 18/00 |
| 2017/0222952 A1* | 8/2017 | Jarvis | H04L 49/205 |

OTHER PUBLICATIONS

Lu Ding et al., "Application-Specific Customization of Dynamic Profiling Mechanisms for Sensor Networks", IEEE Access, Apr. 2015, 20 pages, vol. 3, IEEE Digital Library.
Philip C. Roth et al., "Automated Characterization of Parallel Application Communication Patterns", Oak Ridge National Laboratory, Jun. 17, 2015, 19 pages, Oak Ridge National Laboratory.
(Continued)

*Primary Examiner* — Anna Deng
(74) *Attorney, Agent, or Firm* — Ference & Associates LLC

(57) ABSTRACT

One embodiment provides a method, including: identifying an application executing across a plurality of processors, wherein the application generates communication messages between the plurality of processors; collecting, using a profiler, a plurality of samples of the messages, wherein the plurality of samples are collected at a predetermined sampling rate and wherein the collecting comprises interrupting the execution of the application to collect a sample; determining, using an adaptive sampling technique, if the sampling rate comprises a sampling rate that is sufficiently low while meeting a predetermined quality threshold; adjusting, based upon the sampling rate not comprising a sampling rate that is sufficiently low, the sampling rate, and then collecting samples until the sampling rate comprises the sampling rate that is sufficiently low while meeting a predetermined quality threshold; and building, using the collected samples, an output performance profile of the application.

18 Claims, 2 Drawing Sheets

(56) References Cited

OTHER PUBLICATIONS

Ahmad Afsahi et al., "Efficient Communication Using Message Prediction for Cluster of Multiprocessors", Technical Report ECE-99-5, Dec. 1999, 18 pages, Department of Electrical and Computer Engineering, University of Victoria, Victoria, B.C., Canada.
Unknown, "TAU User Guide", Nov. 11, 2016, 137 pages, Department of Computer and Information Science, University of Oregon Advanced Computing Laboratory, LANL, NM Research Centre Juelich, ZAM, Germany.

* cited by examiner

SAMPLING TECHNIQUE TO ADJUST APPLICATION SAMPLING RATE

BACKGROUND

When developing applications or programs, developers want to know the performance requirements and characteristics of the application or program. This provides the developer with an understanding of what processing resources will be necessary for executing the application, so that the developer can ensure that the application will not require more processing resources than may be available for use. By identifying the performance characteristics of the application, the developer can identify whether the application would be scalable.

In order to identify the performance requirements of an application, performance profiles are generated. Profiling an application includes determining the time, communication requirements, resource load, and the like, consumed by each function in the application when it is running or executing on the real system. In the present setting, the profile provides a summary of interprocess communication behavior. Due to the nature of profiling, the profiler must take samples of communications by the application while the application is running. Accordingly, to capture these samples the profiler interrupts the application. Therefore, when more samples are taken more interference is caused to the application.

BRIEF SUMMARY

In summary, one aspect of the invention provides a method, comprising: utilizing at least one processor to execute computer code that performs the steps of: identifying an application executing across a plurality of processors, wherein the application generates communication messages between a subset of the plurality of processors during execution; collecting, using a profiler, a plurality of samples of the communication messages, wherein the plurality of samples are collected at a predetermined sampling rate and wherein the collecting comprises interrupting the execution of the application to collect a sample; determining, using an adaptive sampling technique, if the sampling rate comprises a sampling rate that is sufficiently low to reduce the interruptions to the execution of the application, while meeting a predetermined quality threshold; adjusting, based upon the sampling rate not comprising a sampling rate that is sufficiently low to reduce the interruptions while meeting a predetermined quality threshold, the sampling rate and collecting samples until the sampling rate comprises the minimum sampling rate while meeting a predetermined quality threshold; and building, using the collected plurality of samples and the samples collected using the adjusted sampling rate, an output performance profile of the application.

Another aspect of the invention provides an apparatus, comprising: at least one processor; and a computer readable storage medium having computer readable program code embodied therewith and executable by the at least one processor, the computer readable program code comprising: computer readable program code that identifies an application executing across a plurality of processors, wherein the application generates communication messages between a subset of the plurality of processors during execution; computer readable program code that collects, using a profiler, a plurality of samples of the communication messages, wherein the plurality of samples are collected at a predetermined sampling rate and wherein the collecting comprises interrupting the execution of the application to collect a sample; computer readable program code that determines, using an adaptive sampling technique, if the sampling rate comprises a sampling rate that is sufficiently low to reduce the interruptions to the execution of the application, while meeting a predetermined quality threshold; computer readable program code that adjusts, based upon the sampling rate not comprising a sampling rate that is sufficiently low to reduce the interruptions while meeting a predetermined quality threshold, the sampling rate and collecting samples until the sampling rate comprises the minimum sampling rate while meeting a predetermined quality threshold; and computer readable program code that builds, using the collected plurality of samples and the samples collected using the adjusted sampling rate, an output performance profile of the application.

An additional aspect of the invention provides a computer program product, comprising: a computer readable storage medium having computer readable program code embodied therewith, the computer readable program code executable by a processor and comprising: computer readable program code that identifies an application executing across a plurality of processors, wherein the application generates communication messages between a subset of the plurality of processors during execution; computer readable program code that collects, using a profiler, a plurality of samples of the communication messages, wherein the plurality of samples are collected at a predetermined sampling rate and wherein the collecting comprises interrupting the execution of the application to collect a sample; computer readable program code that determines, using an adaptive sampling technique, if the sampling rate comprises a sampling rate that is sufficiently low to reduce the interruptions to the execution of the application, while meeting a predetermined quality threshold; computer readable program code that adjusts, based upon the sampling rate not comprising a sampling rate that is sufficiently low to reduce the interruptions while meeting a predetermined quality threshold, the sampling rate and collecting samples until the sampling rate comprises the minimum sampling rate while meeting a predetermined quality threshold; and computer readable program code that builds, using the collected plurality of samples and the samples collected using the adjusted sampling rate, an output performance profile of the application.

A further aspect of the invention provides a method, comprising: utilizing at least one processor to execute computer code that performs the steps of: capturing, using a profiler, a plurality of communication samples from a program executing across a plurality of processors, wherein the plurality of samples are captured at a predetermined sampling rate; identifying a transition of the program to a new function; determining, using a sampling technique and in response to the transition of the program, if the sampling rate needs to be modified to maintain a minimum sampling rate while maintaining a predetermined sample quality; modifying, based upon determining that the sampling rate needs to be adjusted, the sampling rate, and then capturing a plurality of samples at the modified sampling rate, wherein the modified sampling rate is identified using the sampling technique; and providing an output profile of the performance of the program, wherein the output profile is generated using the captured samples and the plurality of samples captured at the modified sampling rate.

For a better understanding of exemplary embodiments of the invention, together with other and further features and advantages thereof, reference is made to the following description, taken in conjunction with the accompanying

DETAILED DESCRIPTION

Figure 1:
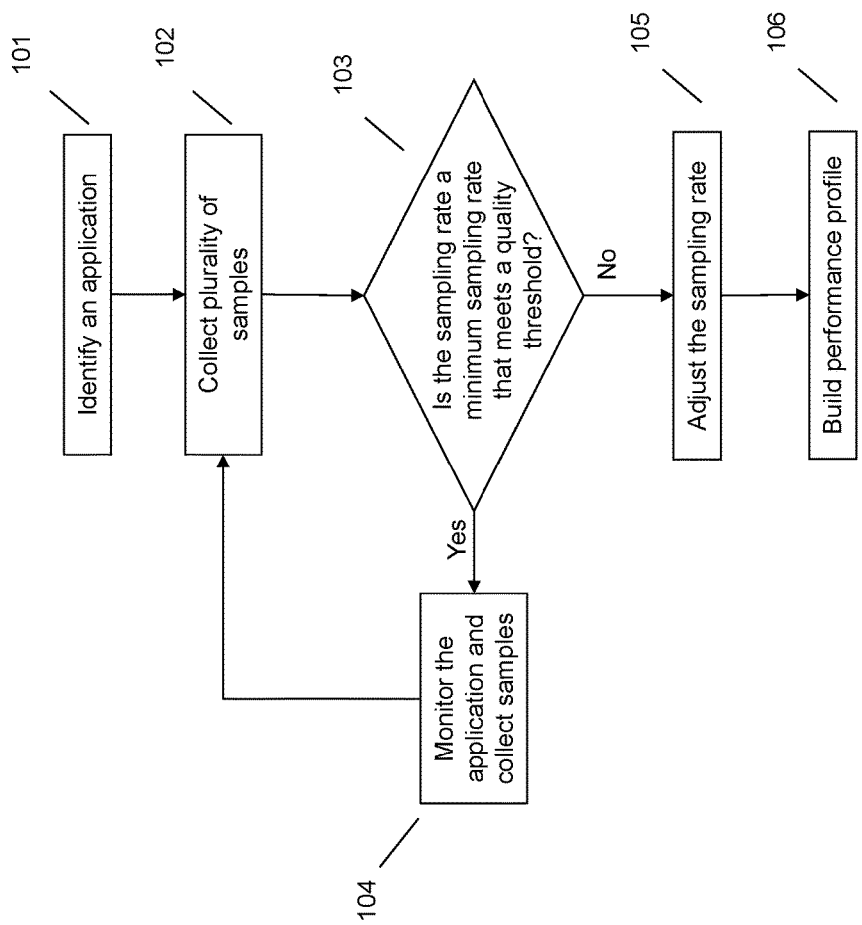
FIG. 1 illustrates a method of identifying if a sampling rate needs to be adjusted and adjusting the sampling rate using a sampling adaptation technique.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Current profiling techniques capture samples at a preconfigured sampling rate, for example, a default sampling rate or a sampling rate set by a user. Due to the fact that higher sampling rates cause more interference to the sampled application, the user tries to set a sampling rate as low as possible. However, if the sampling rate is too low, then the generated profile will not accurately capture the performance requirements of the application. Accordingly, the user must set a sampling rate which balances a sampling rate causing the least amount of interference against a sampling rate that accurately captures performance requirements. Understanding or know what sampling rate would most efficiently strike this balance is difficult without a significant amount of trial and error, which may be time consuming and unfeasible.

Additionally, these sampling rates are set at a specific value for the duration of the execution of the application. Accordingly, no matter what function or phase the application is executing the sampling rate will remain the same. Thus, if one phase or function has irregular performance requirements, these irregular performance requirements will not be identified unless the sampling rate is high enough. However, if the sampling rate is set at a high enough rate to capture these irregular performance requirements, the sampling rate can cause unnecessary interference during execution of phases or functions that are more regular and in which a lower sampling rate would be sufficient to accurately identify the performance requirements. In other words, existing profilers and profiling techniques are not cognizant of dynamic application behavior.

Accordingly, an embodiment provides a method of dynamically adjusting the sampling rate during execution of an application to minimize the interference the application caused by sampling, while maintaining an accurate and quality sampling to identify performance requirements of the application. The system may identify an application executing across a plurality of processors. For example, the application may include an application that communicates with many different processors, for example, in an exascale supercomputing system. As the application executes or runs the application may generate communication messages between a subset of the processors, for example, a communication message between two processors.

The system may use a profiler or other profiling technique to collect or capture a plurality of samples of the communication messages while the application is running. At this point the samples may be collected at a predetermined sampling rate, for example, a default sampling rate, a sampling rate set by a user, and the like. As discussed above, collecting the samples may include interrupting the execution of the application to collect the sample. Using an adaptive sampling technique, for example, a lightweight adaptive sampling technique or a tensor adaptation technique, as introduced herein and as discussed in more detail below, the system may determine if the sampling rate is an ideal sampling rate. An ideal sampling rate may include a sampling rate that minimizes the interference to the execution of the application, while maintaining a predetermined quality threshold. The quality threshold may include the accuracy of the profiler to identify the performance requirements.

If the sampling rate is not the minimum sampling rate that can still maintain the quality requirements, the system may adjust the sampling rate. The adjusted sampling rate may be identified and chosen by the system using the adaptive sampling technique. Identifying the ideal sampling rate may include iteratively collecting samples at a sampling rate, either the original sampling rate or the adjusted sampling rate, determining if the sampling rate needs to be adjusted, and adjusting the sampling rate until an ideal sampling rate is identified. Additionally, an adjustment of the sampling rate may be triggered each time the application transitions to a new phase or function. In other words, one sampling rate may be the ideal sampling rate for a particular phase of the application, but may not be the ideal sampling rate for a different phase or function. Once the application has finished executing, the system may build an output performance profile of the application. The output performance profile, while generated differently as discussed in more detail below, may be similar to conventional output performance profiles.

Such a system provides a technical improvement over current profilers and profiling techniques by providing a way to dynamically adapt the sampling rate during execution of an application. Rather than conventional systems, which require a user to choose and set a sampling rate with the sampling rate then being set throughout the duration of the profiling, the system and methods as described herein can start with a default sampling rate, automatically adjust the sampling rate during execution of the program, and find a sampling rate that balances the desire for minimal interference with the need for accurate performance requirements. Accordingly, the systems and methods as described herein enable scalable collection and analysis of performance data, enable accurate profiling across dynamically changing application phases and/or functions, and help to ensure that the profiling overhead (e.g., time, memory, power, etc.) are minimized. Such a system provides a technique for selecting and adjusting a sampling rate in order to minimize the amount of interference to the application while still maintaining a sampling rate that accurately captures the performance requirements of the application.

Referring now to FIG. 1, at 101 the system may identify an application executing on a system across a plurality of processors. Identifying the application may include receiving an indication by a user to monitor or conduct profiling on the application. In other words, a user may select an application or program for performance profile generation and provide or indicate this selection the system. The application may execute across a plurality of processors, for example, in an exascale supercomputing system. Executing across a plurality of processors may include generating communication messages between a subset of the plurality of processors, for example, exchanging communication messages between two of the processors.

At 102 the system may collect or capture a plurality of samples of the communication messages. The samples may be collected or captured using a profiler or other profiling technique. This initial collection of samples may be collected at a predetermined sampling rate that may be set by default or may be set by a user. For example, a user may identify a sampling rate that should be used for sampling. A sampling rate may identify how frequently a communication message is collected from the application. The sampling rate may be identified as a percentage (e.g., 10% of messages should be collected, etc.), a number of messages per timeframe (e.g., 1 message per second, 10 messages per minute, etc.), or the like.

Collecting the samples may include interrupting the execution of the application, thereby increasing the time required to completely execute the application. Additionally collecting each sample requires processing resources, for example, time, memory, power, and the like, to actually collect the sample. Therefore, an ideal sampling rate would be as low as possible to help reduce the interruptions to the applications and to reduce the amount of processing resources necessary for completing the sampling. Accordingly, as described in more detail below, the systems and methods as described herein attempt to minimize the sampling rate while still maintaining a quality of sampling that provides an accurate representation of the performance of the application. Thus, at 103, the system may determine if the sampling rate comprises a sampling rate that minimizes or reduces the interruptions to the execution of the application while still meeting a predetermined quality threshold.

The predetermined quality threshold may include a threshold set by the user. For example, a user may identify what value of quality should be maintained with respect to measuring the performance of the application. As an example, a user may identify that the measurement of the performance of the application should be within a particular threshold with respect to the actual performance of the application. For example, the user may identify that the representation or measurement of the performance should be within 5% of the actual performance of the application. In other words, the predetermined quality threshold may identify an accuracy that the performance measurement should meet. A more accurate performance measurement allows a developer or user to more accurately determine what resources will be required to execute the application even when the application is scaled. Thus, the quality of the performance measurement is a very important factor when determining the sampling rate.

The determination at 103 may be made using an adaptive sampling technique. One adaptive sampling technique is a lightweight adaptive sampling technique. The lightweight adaptive sampling technique uses a message predictor. For example, for computer programs based on the Message Passing Interface (MPI) paradigm, an MPI message includes information related to the message, for example, who is sending a message, who is receiving a message, the size of the message, are metadata associated with the message, and the like. The message predictor includes a technique for predicting messages that will be sent and information about that message using past message history. For example, the system may determine that a particular message type will be sent at a particular time based upon the fact that a similar message has been sent at a particular frequency. In other words, the message predictor predicts future messages based upon patterns of historical messages.

The lightweight adaptive sampling technique can make use of the message predictor. The technique may use the message predictor to make a prediction about one or more future messages. Once the prediction has been made, the system may verify whether the future messages were actually sent and whether they were sent at the predicted times. In other words, the system may determine the accuracy of the predictions regarding future messages. As the system determines the accuracy of the predictions, the system may generate or determine a prediction rate associated with how accurate the predictions are. The system may then classify the application based upon the prediction rate. A high prediction rate, or prediction rate indicating a high accuracy, indicates that the application is regular, while a low prediction rate, or prediction rate indicating a low accuracy, indicates that the application irregular. One advantage of the lightweight adaptive sampling technique is that each processor can adjust the sampling rate of that processor. In other words, the sampling technique can be done at each processor irrespective of sampling rates of the other processors. Another advantage is that the number of samples required for the predictors is low.

Another sampling technique is the tensor adaptation technique. The tensor adaptation technique utilizes tensors to determine a quality of the sampling rate. A tensor is a higher dimensional generalization of a matrix. For example, a tensor may include a cube of matrices. The system generates a tensor including values for the collected samples. Using different matrix or tensor factorization techniques, the missing values of the tensor may be filled in. As an example, a tensor may include three axes, one axis being a processor, a second axis being another processor, and a third axis being time. When a processor sends a message to another processor at a particular time, the point in the tensor corresponding to those processors at that time can be filled in with a value associated with the message, for example, the number of bytes in the message.

Since the sampling does not occur at every time point included in the tensor, the factorization technique can be used to fill the missing points. Filling these missing points is also known as reconstructing the tensor. The system can then determine the quality of the reconstruction. If you can fill in the tensor well, then the quality is high and the general trends in the data have been captured. If the tensor cannot be filled, or filled badly, then the quality is low and the general trends in the data have not been captured. The quality of the reconstruction can then be compared to a predetermined quality threshold value, for example, as provided by a user or set as a default, to determine if the quality is good or bad.

The tensor adaptation method may be implemented in a centralized or distributed implementation. In the centralized implementation the system may use one or more dedicated processing units to compute the sampling rate and broadcast that sampling rate to all the other processors. In this scenario all processors will sample at the same sampling rate. The dedicated processing unit(s) do not have to get sampling information from every processor, rather, the dedicated processing unit(s) may only get and use sampling rate information from a subset of processors. In other words, in calculating the sampling rate, the dedicated processor(s) may only use information from a subset of the processors.

In the dedicated implementation the system may group processors into different groups. The processors may be grouped based upon different characteristics of the processors. For example, processors may be grouped based upon prior application knowledge, processor performance characteristics, network topology, similar previously identified sampling rates, and the like. The sampling rate for each group may be decided by the group. In other words, the group of processors may decide on a local sampling rate. In making this determination the group of processors will only use sampling information from that group's processors. This dedicated implementation allows for different groups to have different sampling rates. Sampling rates can be shared across groups periodically. The dedicated implementation reduces computational overhead which makes it more scalable than the centralized approach.

If the system determines, at 103, that the sampling rate is the ideal sampling rate (e.g., the sampling rate is not the minimum sampling rate that still meets the quality threshold), the system may make no adjustments to the sampling rate and continue to monitor the application and collect samples at 104. If, however, the system determines, at 103, that the sampling rate is not at the ideal sampling rate, the system may adjust the sampling rate at 105. Adjusting the sampling rate may be based upon the results of the sampling technique. For example, if the system, using the lightweight adaptive sampling technique, classifies the application as a regular application, the system may lower the sampling rate. If, however, the application is classified as an irregular application, the system may raise the sampling rate to make better predictions. In another example, if the system, using the tensor adaptation technique, determines the quality of the reconstruction is above a predetermined quality threshold, or good, the system may reduce the sampling rate. If the system determines the quality of the reconstruction is below a predetermined quality threshold, or bad, the system may increase the sampling rate.

Determining if the sampling rate is the ideal sampling rate and adjusting the sampling rate may be performed until the ideal sampling rate is reached. In other words, the determination of whether the sampling rate needs to be adjusted and adjusting the sampling rate may occur until the system has identified that the ideal sampling rate has been reached. Accordingly, after the sampling rate has been adjusted, the system will collect samples at this new sampling rate and use the sampling technique to determine if the sampling rate is the ideal sampling rate, and then adjust the sampling rate if needed.

To determine if the ideal sampling rate has been met, the system may incrementally adjust the sampling rate until one of the factors is not met. For example, if the system determines that the sampling rate is too low to provide accurate and quality information regarding the performance of the application, the system may incrementally increase the sampling rate until the desired quality and accuracy has been met. Conversely, if the system determines that the sampling rate provides accurate and quality information but does not know if this sampling rate is the minimum possible sampling rate at which accurate information can be provided, the system may incrementally lower the sampling rate. In this case, the system may lower the sampling rate until the quality and accuracy of the information falls below the desired threshold and then raise the sampling rate back up to the immediately preceding sampling rate, which should be equal to the minimum sampling rate in which the desired quality and accuracy of the information are achieved.

Determining and adjusting the sampling rate may be triggered every time the application transitions to a new function or phase. Each function or phase of the application may result in a need for a higher or lower sampling rate. For example, one phase of the application may be more regular, thereby requiring a lower sampling rate, while another phase of the application may be more irregular, thereby requiring a higher sampling rate. Therefore, the system may determine an ideal sampling rate for each phase or function of the application. Accordingly, the system provides a method for dynamically and automatically altering the sampling rate during execution of the application.

At 105 the system may build an output performance profile of the application using the collected samples. The collected samples include all the samples collected during execution of the program, for example, the samples collected at each sampling rate. Conventional techniques have problems stitching together samples taken at different sampling rates. However, the systems and methods as described herein provide a technique for stitching together these samples taken at different sampling rates. Specifically, the system as described herein can use a profile reconstruction technique to stitch together all the samples, no matter the sampling rate. Using a tensor, for example, as described above, the system can enter the known and measured samples into the tensor. The system can then use a tensor factorization technique to fill the missing values of the tensor. Example tensor factorization techniques include canonical decomposition and decomposition into directional components. Other interpolation or prediction techniques can be used and are contemplated. The filled tensor can then be used to generate a performance profile.

Figure 2:
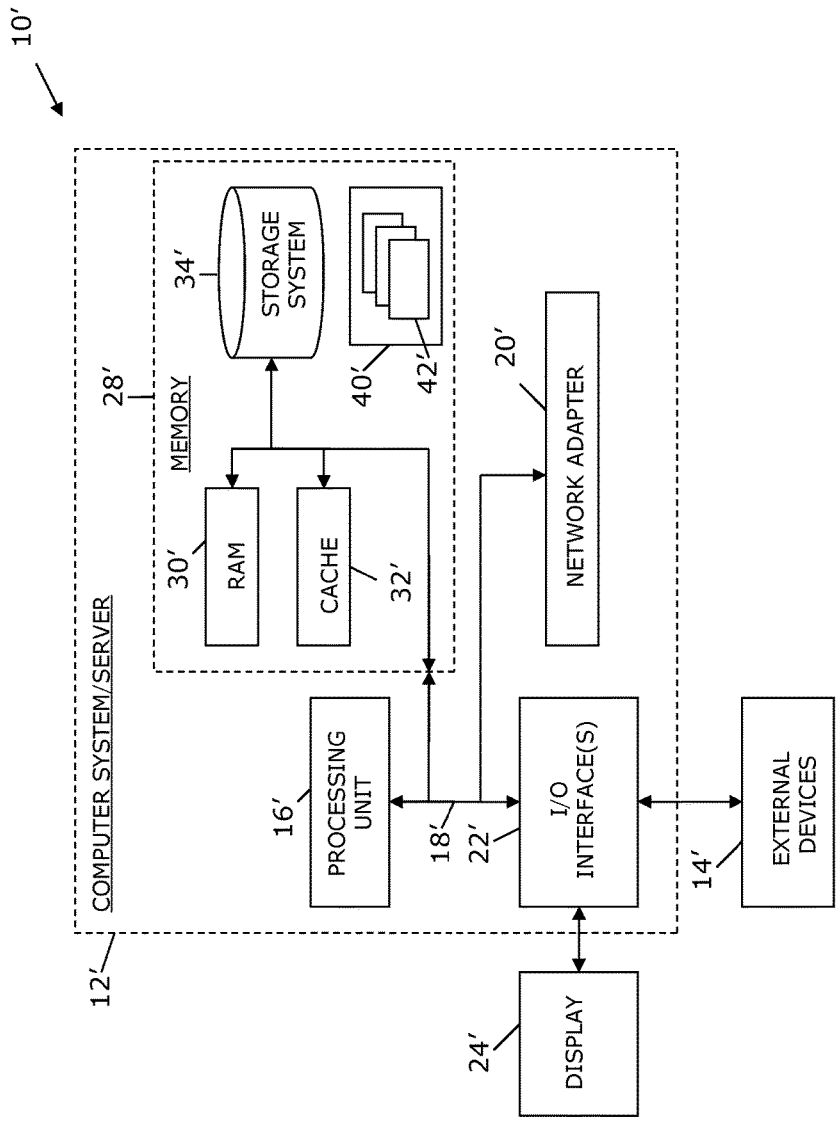
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
identifying an application executing across a plurality of processors, wherein the application generates communication messages between a subset of the plurality of processors during execution;
collecting, using a profiler, a plurality of samples of the communication messages, wherein the plurality of samples are collected at a sampling rate and wherein the collecting comprises interrupting the execution of the application to collect a sample;
determining, using an adaptive sampling technique, if the sampling rate comprises a sampling rate that is sufficiently low to reduce the interruptions to the execution of the application, while meeting a predetermined quality threshold, wherein the adaptive sampling techniques comprises a tensor adaptation technique comprising:
generating a tensor comprising the collected plurality of samples, the generated tensor comprises a plurality of missing values,
filling the plurality of missing values in the generated tensor by applying a tensor factorization technique to reconstruct the tensor, and
comparing a quality of the reconstructed tensor to the predetermined quality threshold;
adjusting, based upon the sampling rate not comprising a sampling rate that is sufficiently low to reduce the interruptions while meeting the predetermined quality threshold, the sampling rate, and then collecting samples until the sampling rate comprises the sampling rate that is sufficiently low while meeting the predetermined quality threshold; and building, using the collected plurality of samples and the samples collected using the adjusted sampling rate, an output performance profile of the application.

2. The method of claim 1, wherein the adjusting the sampling rate and collecting samples comprises iteratively performing the steps of: the collecting a plurality of samples, the determining, and the adjusting the sampling rate.

3. The method of claim 1, wherein the adaptive sampling technique comprises a lightweight adaptive sampling technique comprising:
using a message predictor to make a plurality of predictions regarding information of a plurality of future messages; and
determining an prediction rate associated with the plurality of predictions by verifying, after the future message has been sent, the predicted information regarding the future message.

4. The method of claim 3, wherein the lightweight adaptive sampling technique comprises classifying the application as regular based upon determining the prediction rate is above a predetermined threshold; and
wherein the adjusting the sampling rate comprises lowering the sampling rate based upon the application being classified as regular.

5. The method of claim 3, wherein the lightweight adaptive sampling technique comprises classifying the application as irregular based upon determining the prediction rate is below a predetermined threshold; and
wherein the adjusting the sampling rate comprises raising the sampling rate based upon the application being classified as irregular.

6. The method of claim 1, wherein the tensor adaptation technique comprises determining the quality of reconstruction is below the predetermined quality threshold; and
wherein the adjusting the sampling rate comprises increasing the sampling rate.

7. The method of claim 1, wherein the tensor adaptation technique comprises determining the quality of reconstruction is above the predetermined quality threshold; and
wherein the adjusting the sampling rate comprises decreasing the sampling rate.

8. The method of claim 1, wherein the building an output performance profile of the application comprises stitching together (i) the collected plurality of samples and (ii) the samples collected using the adjusted sampling rate.

9. The method of claim 1, wherein the determining and the adjusting the sampling rate are triggered when the application transfers to a new function within the application.

10. An apparatus, comprising:
at least one processor; and
a computer readable storage medium having computer readable program code embodied therewith and executable by the at least one processor, the computer readable program code comprising:
computer readable program code that identifies an application executing across a plurality of processors, wherein the application generates communication messages between a subset of the plurality of processors during execution;
computer readable program code that collects, using a profiler, a plurality of samples of the communication messages, wherein the plurality of samples are collected at a sampling rate and wherein the collecting comprises interrupting the execution of the application to collect a sample;
computer readable program code that determines, using an adaptive sampling technique, if the sampling rate comprises a sampling rate that is sufficiently low to reduce the interruptions to the execution of the application, while meeting a predetermined quality threshold, wherein the adaptive sampling techniques comprising a tensor adaptation technique comprising:
generating a tensor comprising the collected plurality of samples, the generated tensor comprises a plurality of missing values,
filling the plurality of missing values in the generated tensor by applying a tensor factorization technique to reconstruct the tensor, and
comparing a quality of the reconstructed tensor to the predetermined quality threshold;
computer readable program code that adjusts, based upon the sampling rate not comprising a sampling rate that is sufficiently low to reduce the interruptions while meeting the predetermined quality threshold, the sampling rate, and then collecting samples until the sampling rate comprises the sampling rate that is sufficiently low while meeting the predetermined quality threshold; and
computer readable program code that builds, using the collected plurality of samples and the samples collected using the adjusted sampling rate, an output performance profile of the application.

11. A computer program product, comprising:
a computer readable storage medium having computer readable program code embodied therewith, the computer readable program code executable by a processor and comprising:
computer readable program code that identifies an application executing across a plurality of processors, wherein the application generates communication messages between a subset of the plurality of processors during execution;
computer readable program code that collects, using a profiler, a plurality of samples of the communication messages, wherein the plurality of samples are collected at a sampling rate and wherein the collecting comprises interrupting the execution of the application to collect a sample;
computer readable program code that determines, using an adaptive sampling technique, if the sampling rate comprises a sampling rate that is sufficiently low to reduce the interruptions to the execution of the application, while meeting a predetermined quality threshold, wherein the adaptive sampling techniques comprises a tensor adaptation technique comprising:
generating a tensor comprising the collected plurality of samples, the generated tensor comprises a plurality of missing values,
filling the plurality of missing values in the generated tensor by applying a tensor factorization technique to reconstruct the tensor, and
comparing a quality of the reconstructed tensor to the predetermined quality threshold;
computer readable program code that adjusts, based upon the sampling rate not comprising a sampling rate that is sufficiently low to reduce the interruptions while meeting the predetermined quality threshold, the sampling rate, and then collecting samples until the sampling rate comprises the sampling rate that is sufficiently low while meeting the predetermined quality threshold; and
computer readable program code that builds, using the collected plurality of samples and the samples collected using the adjusted sampling rate, an output performance profile of the application.

12. The computer program product of claim 11, wherein the adjusting the sampling rate and collecting samples comprises iteratively performing the steps of: the collecting a plurality of samples, the determining, and the adjusting the sampling rate.

13. The computer program product of claim 11, wherein the adaptive sampling technique comprises a lightweight adaptive sampling technique comprising:
   using a message predictor to make a plurality of predictions regarding information of a plurality of future messages; and
   determining an prediction rate associated with the plurality of predictions by verifying, after the future message has been sent, the predicted information regarding the future message.

14. The computer program product of claim 13, wherein the lightweight adaptive sampling technique comprises classifying the application as regular based upon determining the prediction rate is above a predetermined threshold; and
   wherein the adjusting the sampling rate comprises lowering the sampling rate based upon the application being classified as regular.

15. The computer program product of claim 13, wherein the lightweight adaptive sampling technique comprises classifying the application as irregular based upon determining the prediction rate is below a predetermined threshold; and
   wherein the adjusting the sampling rate comprises raising the sampling rate based upon the application being classified as irregular.

16. The computer program product of claim 11, wherein the tensor adaptation technique comprises determining the quality of reconstruction is below the predetermined quality threshold; and
   wherein the adjusting the sampling rate comprises increasing the sampling rate.

17. The computer program product of claim 11, wherein the tensor adaptation technique comprises determining the quality of reconstruction is above the predetermined quality threshold; and
   wherein the adjusting the sampling rate comprises decreasing the sampling rate.

18. A method, comprising:
   utilizing at least one processor to execute computer code that performs the steps of:
   capturing, using a profiler, a plurality of communication samples from a program executing across a plurality of processors, wherein the plurality of communication samples are captured at a sampling rate;
   identifying a transition of the program to a new function;
   determining, using a sampling technique and in response to the transition of the program, if the sampling rate needs to be modified to maintain a minimum sampling rate while maintaining a predetermined sample quality, wherein the sampling techniques comprises a tensor adaptation technique comprising:
      generating a tensor comprising the collected plurality of communication samples, the generated tensor comprises a plurality of missing values,
      filling in the plurality of missing values by applying a tensor factorization technique to reconstruct the tensor, and
      comparing a quality of the reconstructed tensor to the predetermined sample quality;
   modifying, based upon determining that the sampling rate needs to be modified, the sampling rate, and then capturing a plurality of communication samples at the modified sampling rate, wherein the modified sampling rate is identified using the sampling technique; and
   providing an output profile of the performance of the program, wherein the output profile is generated using the captured plurality of communication samples at the sampling rate and the modified sampling rate.

* * * * *